United States Patent
Ishihara et al.

(10) Patent No.: US 8,461,270 B2
(45) Date of Patent: Jun. 11, 2013

(54) OLEFIN/AROMATIC VINYL COPOLYMER, PROCESS FOR PRODUCTION THEREOF, RESIN COMPOSITIONS CONTAINING THE COPOLYMER, AND STRETCHED PRODUCTS OF THE COPOLYMER

(75) Inventors: Nobuhide Ishihara, Chiba (JP); Zhaomin Hou, Tokyo (JP)

(73) Assignees: Idemitsu Kosan Co., Ltd., Tokyo (JP); Riken, Wako-shi (JP)

( * ) Notice: Subject to any disclaimer, the term of this patent is extended or adjusted under 35 U.S.C. 154(b) by 121 days.

(21) Appl. No.: 12/663,934

(22) PCT Filed: May 29, 2008

(86) PCT No.: PCT/JP2008/059874
§ 371 (c)(1),
(2), (4) Date: Nov. 8, 2010

(87) PCT Pub. No.: WO2008/152917
PCT Pub. Date: Dec. 18, 2008

(65) Prior Publication Data
US 2011/0172366 A1    Jul. 14, 2011

(30) Foreign Application Priority Data

Jun. 13, 2007 (JP) .................................. 2007-156742

(51) Int. Cl.
*C08F 212/08* (2006.01)
*C08F 4/52* (2006.01)

(52) U.S. Cl.
USPC ............................ 525/240; 526/347; 526/170

(58) Field of Classification Search
USPC .............................. 526/90, 347, 170; 525/240
See application file for complete search history.

(56) References Cited

U.S. PATENT DOCUMENTS

| 5,166,238 A | 11/1992 | Nakano et al. |
| 5,395,890 A | 3/1995 | Nakano et al. |
| 6,838,409 B1 | 1/2005 | Yabunouchi et al. |
| 6,939,929 B2 * | 9/2005 | Yokota et al. ................. 526/160 |
| 2002/0058585 A1 | 5/2002 | Christopher et al. |
| 2002/0137859 A1 | 9/2002 | Yokota et al. |
| 2004/0059075 A1 * | 3/2004 | Lee et al. ...................... 526/173 |
| 2007/0232758 A1 | 10/2007 | Hou et al. |

FOREIGN PATENT DOCUMENTS

| CN | 1491255 A | 4/2004 |
| EP | 0 291 915 A2 | 11/1988 |
| EP | 0 299 391 A1 | 1/1989 |
| EP | 0 318 793 A1 | 6/1989 |
| EP | 1 764 375 A1 | 3/2007 |
| JP | 1 146944 | 6/1989 |
| JP | 1 182346 | 7/1989 |
| JP | 3 7705 | 1/1991 |
| JP | 04 130114 | 5/1992 |
| JP | 2001 354724 | 12/2001 |
| WO | 00 18808 | 4/2000 |
| WO | WO 02/068532 A1 | 9/2002 |
| WO | 2006 004068 | 1/2006 |

OTHER PUBLICATIONS

Office Action issued Jun. 3, 2011, in China Patetn Application No. 200880024081.1.

Search Report issued Sep. 2, 2010, in European Patent Application No. 08764843.2-2109/2157108.

\* cited by examiner

Primary Examiner — Robert D. Harlan
(74) Attorney, Agent, or Firm — Oblon, Spivak, McClelland, Maier & Neustadt, L.L.P.

(57) ABSTRACT

The present invention relates to such a copolymer comprising an olefin and an aromatic vinyl compound that has a syndiotactic structure, high block property and a wide molecular weight distribution. Specifically, it relates to a copolymer comprising an olefin and an aromatic vinyl compound, in which a content of the aromatic vinyl compound is from 1 to 99% by mol; a molecular distribution is 1.7 or more; a signal based on an (olefin-aromatic vinyl compound-olefin) linkage as a node of the copolymer, a signal based on an (aromatic vinyl compound-aromatic vinyl compound-olefin) linkage, a signal based on an (aromatic vinyl compound-aromatic vinyl compound-aromatic vinyl compound) linkage as a block linkage of the aromatic vinyl compound, and a signal based on an (olefin-olefin-olefin) linkage as a block linkage of the olefin are present; an index showing block property of the aromatic vinyl compound component is from 30 to 100%; and a stereoregularity of a repeating unit chain constituted by the aromatic vinyl compound is 80% by mol or more, a method for producing the same, a resin composition, and a stretched product.

18 Claims, 4 Drawing Sheets

Fig. 1

Fig. 1: $^{13}$C-NMR (overall view)

Fig. 2

Fig. 2: $^{13}$C-NMR (enlarged view)

Fig. 3

Fig. 3: $^{13}$C-NMR (overall view)

Fig. 4

Fig. 4: $^{13}$C-NMR (enlarged view)

Fig. 5

Fig. 5: $^{13}$C-NMR (overall view)

Fig. 6

Fig. 6: $^{13}$C-NMR (enlarged view)

Fig. 7

Fig. 7: $^{13}$C-NMR (overall view)

Fig. 8

Fig. 8: $^{13}$C-NMR (enlarged view)

OLEFIN/AROMATIC VINYL COPOLYMER, PROCESS FOR PRODUCTION THEREOF, RESIN COMPOSITIONS CONTAINING THE COPOLYMER, AND STRETCHED PRODUCTS OF THE COPOLYMER

TECHNICAL FIELD

The present invention relates to a copolymer comprising an olefin and an aromatic vinyl compound, a method for producing the same, a resin composition containing the copolymer, and a stretched product of the copolymer. More specifically, it relates to a styrene copolymer that has a syndiotactic structure, high block property and a wide molecular weight distribution, a method for producing the copolymer using a polymerization catalyst containing a transition metal, a resin composition containing the copolymer with a rubber polymer mixed therein that is excellent in heat resistance and impact resistance, and a stretched product of the copolymer having been stretched that is excellent in mechanical strength, ductility and transparency.

BACKGROUND ART

A styrene polymer has a defect of inferior heat resistance when the steric structure has an atactic structure, and has a defect of inferior impact resistance while having excellent heat resistance when the steric structure thereof has a syndiotactic structure. For avoiding the defects accordingly, a styrene copolymer having a syndiotactic structure of a styrene monomer and an olefin, such as ethylene, is proposed (see Patent Documents 1 to 3). However, the catalyst system proposed in Patent Document 3 has low activity at a high temperature that is generally used in production with a plant, and a resulting copolymer is inferior in molding property due to the narrow molecular weight distribution thereof. A block copolymer excellent in mechanical strength is also known (see Patent Document 4), but is inferior in heat resistance due to the styrene part thereof having an atactic structure. Accordingly, associated with enhancement of capabilities of materials, such a styrene copolymer and a production method thereof are demanded that is excellent in heat resistance and impact resistance.

Such a styrene resin composition is known that contains a styrene polymer excellent in heat resistance having a syndiotactic structure having a rubber polymer mixed therein for improving the impact resistance (see Patent Document 5). However, the kind of the usable rubber polymer is limited in consideration of compatibility with the styrene polymer, and when the amount of the rubber polymer for improving the impact resistance is increased, the heat resistance is decreased to make it difficult to attain both the heat resistance and the impact resistance simultaneously. Accordingly, there is a demand of a styrene resin composition having a syndiotactic structure excellent in heat resistance and impact resistance.

By stretching a styrene polymer having high syndiotacticity, a stretched product excellent in mechanical strength, particularly elastic modulus, can be obtained, but the article has a defect in poor ductility. In order to avoid the defect, a styrene derivative is copolymerized therewith to improve the ductility, but such a stretched product of a styrene polymer is demanded that has a syndiotactic structure and is further improved in ductility.

[Patent Document 1] JP-A-3-7705
[Patent Document 2] JP-A-4-130114
[Patent Document 3] WO2006/4068A1
[Patent Document 4] JP-A-2001-354724
[Patent Document 5] JP-A-1-146944

DISCLOSURE OF THE INVENTION

Problems to be Solved by the Invention

An object of the invention is to provide such a copolymer comprising an olefin and an aromatic vinyl compound that has a syndiotactic structure, high block property and a wide molecular weight distribution, a method for producing the same, such a resin composition containing the copolymer that is excellent in heat resistance and impact resistance, and such a molded article containing the copolymer that is excellent in mechanical strength, ductility and transparency.

Means for Solving the Problems

As a result of earnest investigations reiterated by the inventors, it has been found that a copolymer having a syndiotactic structure that has high block property and a wide molecular weight distribution can be obtained by copolymerizing an olefin and an aromatic vinyl compound in the presence of a polymerization catalyst containing a transition metal, a resin composition that is excellent in heat resistance and impact resistance can be obtained by mixing a rubber polymer with the copolymer, and a stretched product that is excellent in mechanical strength, ductility and transparency can be obtained by stretching the copolymer, and thus the invention has been completed.

The invention provide the following items (1) to (4).

(1) A copolymer comprising an olefin and an aromatic vinyl compound, characterized in that: a content of a unit derived from the aromatic vinyl compound is from 1 to 99% by mol; a molecular distribution (Mw/Mn) measured by a GPC method is 1.7 or more; in $^{13}$C-NMR measurement, a signal $T_{\delta\delta}$ based on an (olefin-aromatic vinyl compound-olefin) linkage as a node of the copolymer, a signal $T_{\beta\delta}$ based on an (aromatic vinyl compound-aromatic vinyl compound-olefin) linkage, a signal $T_{\beta\beta}$ based on an (aromatic vinyl compound-aromatic vinyl compound-aromatic vinyl compound) linkage as a block linkage of the aromatic vinyl compound, and a signal $S_{\delta\delta}$ based on an (olefin-olefin-olefin) linkage as a block linkage of the olefin are present; an index $\Theta$ showing block property of the aromatic vinyl compound component represented by the following relational expression is from 30 to 100%; and a stereoregularity [rrrr] of a repeating unit chain constituted by the aromatic vinyl compound is 80% by mol or more:

$$\Theta = \frac{I(T_{\beta\beta} + T_{\beta\delta})}{I(T_{\delta\delta} + T_{\gamma\delta} + T_{\beta\beta} + T_{\beta\delta})} \times 100(\%)$$

wherein I ($T_{\beta\beta}+T_{\beta\delta}$) represents a sum of intensities of the signal $T_{\beta\beta}$ and the signal $T_{\beta\delta}$ in the $^{13}$C-NMR measurement, and I ($T_{\delta\delta}+T_{\gamma\delta}+T_{\beta\beta}+T_{\beta\delta}$) represents a sum of intensities of signals $T_{\delta\delta}$, $T_{\gamma\delta}$, $T_{\beta\beta}$ and $T_{\beta\delta}$ based on all linkages that the aromatic vinyl compound contributes to in the $^{13}$C-NMR measurement, wherein $T_{\gamma\delta}$ represents a signal based on an (aromatic vinyl compound-aromatic vinyl compound-olefin-olefin) linkage as a heterogeneous bond or a signal based on an (aromatic vinyl compound-olefin-aromatic vinyl compound-olefin) linkage as a heterogeneous bond.

(2) A method for producing the copolymer comprising an olefin and an aromatic vinyl compound according to the item (1), including: copolymerizing an olefin and an aromatic vinyl compound in the presence of a polymerization catalyst containing a transition metal.

(3) A resin composition characterized by comprising from 1 to 50 parts by mass of a rubber polymer mixed with 100 parts by mass of the copolymer comprising an olefin and an aromatic vinyl compound according to the item (1).

(4) A stretched product containing the copolymer comprising an olefin and an aromatic vinyl compound according to the item (1) having been stretched.

Advantages of the Invention

According to the invention, such a copolymer comprising an olefin and an aromatic vinyl compound is obtained that has a syndiotactic structure, high block property and a wide molecular weight distribution. A resin composition containing the copolymer having a rubber polymer mixed therewith is excellent in heat resistance and impact resistance, and a stretched product containing the copolymer is excellent in mechanical strength, ductility and transparency.

BEST MODE FOR CARRYING OUT THE INVENTION

The invention will be described in detail below.
[Copolymer Comprising Olefin and Aromatic Vinyl Compound]

The copolymer comprising an olefin and an aromatic vinyl compound of the invention (which may be hereinafter referred to as a copolymer or a block copolymer) has (A) a content of a unit derived from the aromatic vinyl compound of from 1 to 99% by mol, (B) a molecular distribution (Mw/Mn) measured by a GPC method of 1.7 or more, (C) an index Θ showing block property of the aromatic vinyl compound component of from 30 to 100%, and (D) a stereoregularity [rrrr] of a repeating unit chain constituted by the aromatic vinyl compound of 80% by mol or more.
(A) Contents of Olefin Unit and Aromatic Vinyl Compound Unit Examples of the olefin used in the invention include ethylene, propylene, 1-butene, 1-pentene, 1-hexene, 1-heptene, 1-octene, 1-nonene, 1-decene, 4-phenyl-1-butene, 6-phenyl-1-hexene, 3-methyl-1-butene, 4-methyl-1-butene, 3-methyl-1-pentene, 4-methyl-1-pentene, 3-methyl-1-hexene, 4-methyl-1-hexene, 5-methyl-1-hexene, 3,3-dimethyl-1-pentene, 3,4-dimethyl-1-pentene, 4,4-dimethyl-1-pentene, vinylcyclohexane, hexafluoropropene, tetrafluoroethylene, 2-fluoropropene, fluoroethylene, 1,1-difluoroethylene, 3-fluoropropene, trifluoroethylene, 3,4-dichloro-1-butene, butadiene and dicyclopentadiene, and among these, ethylene, propylene, 1-hexene and 1-octane are preferred. These may be used solely or as a combination of two or more kinds of them.

Examples of the aromatic vinyl compound include styrene, an alkylstyrene, such as p-methylstyrene, p-ethylstyrene, p-propylstyrene, p-isopropylstyrene, p-butylstyrene, p-tert-butylstyrene, o-methylstyrene, o-ethylstyrene, o-propylstyrene, o-isopropylstyrene, m-methylstyrene, m-ethylstyrene, m-propylstyrene, m-isopropylstyrene, m-butylstyrene, mesitylstyrene, 2,4-dimethylstyrene, 2,5-dimethylstyrene, 3,5-dimethylstyrene and 4-butenylstyrene, a halogenated styrene, such as p-chlorostyrene, m-chlorostyrene, o-chlorostyrene, p-bromostyrene, m-bromostyrene, o-bromostyrene, p-fluorostyrene, m-fluorostyrene, o-fluorostyrene and o-methyl-p-fluorostyrene, an alkoxystyrene, such as p-methoxystyrene, o-methoxystyrene and m-methoxystyrene, and a vinylbenzoate ester, and among these, styrene, p-methylstyrene and p-tert-butylstyrene are preferred. These may be used solely or as a combination of two or more kinds of them.

In the copolymer comprising an olefin and an aromatic vinyl compound of the invention, the content of the aromatic vinyl compound unit is from 1 to 99% by mol, preferably from 5 to 99% by mol, and more preferably from 40 to 95% by mol. Accordingly, the content of the olefin unit is from 1 to 99% by mol, preferably from 1 to 95% by mol, and more preferably from 5 to 60% by mol. In the case where the content of the olefin unit is less than 1% by mol, the copolymer is insufficient in ductility, and the resin composition containing the copolymer having a rubber polymer mixed therewith is insufficient in impact resistance. In the case where the content of the olefin unit exceeds 99% by mol, the copolymer is insufficient in heat resistance, thereby lowering the heat resistance of the resin composition.
(B) Molecular Weight Distribution In the copolymer comprising an olefin and an aromatic vinyl compound of the invention, the molecular weight distribution (Mw/Mn) measured by a GPC method is 1.7 or more, preferably from 2.0 to 5.0, and more preferably from 2.0 to 3.5. In the case where the molecular weight distribution is less than 1.7, the viscosity is insufficient, thereby lowering the moldability of the resin composition containing the copolymer having a rubber polymer mixed therewith.

The molecular weight distribution is given by a ratio (Mw/Mn) of the weight average molecular weight (Mw) and the number average molecular weight (Mn) measured by a gel permeation chromatograph (GPC) method. The GPC measurement was performed with a GPC column, Shodex UT806L (produced by GL Science, Inc.) under conditions of a temperature of 145° C., 1,2,4-trichlorobenzene as a solvent, and a flow rate of 1.0 mL/min.

The weight average molecular weight of the copolymer of the invention is not particularly limited, and is generally in a range of from 10,000 to 3,000,000, and preferably from 50,000 to 900,000, in terms of polystyrene conversion, from the standpoint of impact resistance.
(C) Block Property of Aromatic Vinyl Compound Component In the copolymer of the invention, in $^{13}$C-NMR measurement, a signal $T_{\delta\delta}$ based on an (olefin-aromatic vinyl compound-olefin) linkage as a node of the copolymer, and a signal $T_{\beta\delta}$ based on an (aromatic vinyl compound-aromatic vinyl compound-olefin) linkage are present, a signal $T_{\beta\beta}$ based on an (aromatic vinyl compound-aromatic vinyl compound-aromatic vinyl compound) linkage as a block linkage of the aromatic vinyl compound, and a signal $S_{\delta\delta}$ based on an (olefin-olefin-olefin) linkage as a block linkage of the olefin are present, and the index Θ showing the block property of the aromatic vinyl compound component represented by the following relational expression is from 30 to 100%.

$$\Theta = \frac{I(T_{\beta\beta} + T_{\beta\delta})}{I(T_{\delta\delta} + T_{\gamma\delta} + T_{\beta\beta} + T_{\beta\delta})} \times 100 (\%)$$

wherein I ($T_{\beta\beta}$+$T_{\beta\delta}$) represents a sum of intensities of the signal $T_{\beta\beta}$ and the signal $T_{\beta\delta}$ in the $^{13}$C-NMR measurement, and I ($T_{\delta\delta}$+$T_{\gamma\delta}$+$T_{\beta\beta}$+$T_{\beta\delta}$) represents a sum of intensities of signals $T_{\delta\delta}$, $T_{\gamma\delta}$, $T_{\beta\beta}$ and $T_{\beta\delta}$ based on all linkages that the aromatic vinyl compound contributes to in the $^{13}$C-NMR measurement, wherein $T_{\gamma\delta}$ represents a signal based on an (aromatic vinyl compound-aromatic vinyl compound-olefin-olefin) linkage as a heterogeneous bond or a signal based on an (aromatic vinyl compound-olefin-aromatic vinyl compound-olefin) linkage as a heterogeneous bond.

In general, a block copolymer among kinds of copolymers exerts maximally the properties attributed to polymers obtained from monomers used and exhibits the characteristics of the copolymer. Accordingly, the block property is preferably high for exerting maximally the properties of the olefin and the property of the aromatic vinyl compound, and the copolymer of the invention does have high block property, particularly high block property of the aromatic vinyl compound component. Specifically, in the copolymer of the invention, the index $\Theta$ showing the block property of the aromatic vinyl compound component represented by the aforementioned relational expression is as high as from 30 to 100%. The value of the index $\Theta$ is preferably from 50 to 100%, and more preferably from 80 to 100%. In the case where the value $\Theta$ is less than 30%, the heat resistance, which is a characteristic feature of the copolymer having a syndiotactic structure, is lowered due to the low block property.

A block copolymer is such a copolymer that monomers of the same kind are continued in a long sequence, and a syndiotactic structure is such a steric structure that substituents, such as phenyl groups, as side chains are positioned in the opposite sides alternately with respect to a main chain formed from carbon-carbon bonds. These can be measured by a magnetic nuclear resonance method with isotopic carbon ($^{13}$C-NMR method).

Calculation of the index $\Theta$ showing the block property will be described in detail in the examples, and in the copolymer of the invention, the values of the signal $T_{\beta\beta}$ and the signal $T_{\beta\delta}$ measured by $^{13}$C-NMR strongly reflect the block property of the aromatic vinyl compound. Accordingly, the value of the index $\Theta$ showing the block property of the aromatic vinyl compound can be obtained by the aforementioned relational expression with the sum of intensities of the signals ($T_{\beta\beta}$+$T_{\beta\delta}$) that strongly reflect the block property of the aromatic vinyl compound and the sum of the intensities of the signals ($T_{\delta\delta}$+$T_{\gamma\delta}$+$T_{\beta\beta}$+$T_{\beta\delta}$) based on all the linkages that the aromatic vinyl compound contributes to.

The $^{13}$C-NMR measurement in the invention is performed with lambda 500, produced by JEOL Ltd., in such a manner that a specimen is placed in an NMR tube having a diameter of 1 cm, to which 3 mL of a solvent of 1,2,4-trichlorobenzene/deuterated benzene=9/1 (by volume) is added, and the specimen was dissolved by heating to 140° C. and heated to 130° C.

(D) Stereoregularity (Racemic Pentad Fraction [rrrr])

The copolymer of the invention has a syndiotactic structure as a characteristic feature. Specifically, the copolymer, in which repeating units derived from the aromatic vinyl compound are continued, is characterized by having a large ratio of the aromatic rings of the repeating units that are positioned alternately with respect to the plane formed by the polymer main chain (i.e., syndiotacticity). The syndiotacticity can be expressed by the stereoregularity [rrrr] of the repeating unit chain derived from the aromatic vinyl compound. In the copolymer of the invention, the stereoregularity [rrrr] is 80% by mol or more, preferably 95% by mol or more, and more preferably 98% by mol or more. In the case where it is less than 80% by mol, the heat resistance, which is a characteristic feature of the syndiotactic structure, is lowered.

The stereoregularity [rrrr] is a racemic fraction (% by mol) in terms of pentad (a series of five units) in the copolymer, and is an index of homogeneity of stereoregularity distribution. The stereoregularity [rrrr] can be calculated from $^{13}$C-NMR spectrum measurement according to the method proposed by A. Zambelli, et al., Macromolecules, vol. 6, p. 925 (1973). Specifically, the stereoregularity [rrrr] is expressed by the fraction of the peaks within the phenyl C1 carbon region (146.3 ppm to 144.5 ppm) of the styrene chain in the copolymer except for noises (such as satellite peaks and spinning side bands).

[Production Method of Copolymer comprising Olefin and Aromatic Vinyl Compound]

Examples of the production method of the copolymer comprising an olefin and an aromatic vinyl compound of the invention include a method of polymerizing an olefin and an aromatic vinyl compound in the presence of a polymerization catalyst containing a transition metal. The polymerization method employed may be preferably block polymerization, solution polymerization or the like. In the block polymerization method, no solvent is used, and a solvent used in the solution polymerization method is preferably an inert solvent. Examples of the solvent include an aromatic hydrocarbon, such as benzene, toluene, xylene and ethylbenzene, an alicyclic hydrocarbon, such as cyclohexane, and an aliphatic hydrocarbon, such as pentane, hexane and heptane. The polymerization temperature is generally in a range of from 0 to 200° C., and preferably from 0 to 120° C. The pressure upon polymerization is generally in a range of from 0.01 to 30 MPa, and preferably from 0.01 to 3 MPa.

[Polymerization Catalyst]

The polymerization catalyst used for producing the copolymer comprising an olefin and an aromatic vinyl compound of the invention is preferably a catalyst containing: a transition metal compound represented by the following general formula (I); an ionic compound containing a non-coordinatable anion capable of forming an ionic complex through reaction with the transition metal compound, and a cation; and an organoaluminum compound.

[Chemical Formula 1]

$$AMX_{a-1}Y_b \qquad (I)$$

wherein A represents a π-bonding condensed polycyclic cyclopentadienyl ligand represented by the following general formula (II), in which at least one of multimembered rings condensed to the cyclopentadienyl group is a saturated ring; M represents a transition metal of the Group 3 or the lanthanoid series in the periodic table; X represents a σ-bonding ligand, provided that when there are plural ligands represented by X, the plural ligands represented by X may be the same as or different from each other, and may be bonded to each other through an arbitrary group; Y represents a Lewis base, which may be crosslinked to another group represented by Y or X; a represents a valency of M; and b represents 0 or 1.

[chemical formula 2]

(II)

wherein $R^1$ and $R^3$ each represent a hydrogen atom, a halogen atom, an aliphatic hydrocarbon group having from 1 to 20 carbon atoms, an aromatic hydrocarbon group having from 6 to 20 carbon atoms, an alkoxy group having from 1 to 20 carbon atoms, an aryloxy group having from 6 to 20 carbon atoms, a thioalkoxy group having from 1 to 20 carbon atoms, a thioaryloxy group having from 6 to 20 carbon atoms, an amino group, an amide group, a carboxyl group or an alkylsilyl group, provided that plural groups represented by $R^1$ may be the same as or different from each other, and plural groups represented by $R^3$ may be the same as or different from each other; $R^2$ represents a halogen atom, an aliphatic hydrocarbon group having from 1 to 20 carbon atoms, an aromatic hydrocarbon group having from 6 to 20 carbon atoms, an alkoxy group having from 1 to 20 carbon atoms, an aryloxy group having from 6 to 20 carbon atoms, a thioalkoxy group having from 1 to 20 carbon atoms, a thioaryloxy group having from 6 to 20 carbon atoms, an amino group, an amide group, a carboxyl group or an alkylsilyl group, provided that $R^1$ and $R^2$, $R^2$ and $R^3$, and $R^1$ and $R^3$ each may be bonded to each other to form a saturated ring; and c represents an integer of 1 or more.

In the transition metal compound represented by the general formula (I), X represents a σ-bonding ligand, and examples thereof include a hydrogen atom, a halogen atom, a hydrocarbon group having from 1 to 20 carbon atoms, an alkoxy group having from 1 to 20 carbon atoms, an aryloxy group having from 6 to 20 carbon atoms, an amide group having from 1 to 20 carbon atoms, a silyl group having from 1 to 20 carbon atoms, a phosphide group having from 1 to 20 carbon atoms, a sulfide group having from 1 to 20 carbon atoms and an acyl group having from 1 to 20 carbon atoms. Y represents a Lewis base, and examples thereof include an amine compound, an ether compound, a phosphine compound and a thioether compound.

Examples of the halogen atom include fluorine, chlorine, bromine and iodine. Examples of the hydrocarbon group having from 1 to 20 carbon atoms include an alkyl group, such as a methyl group, an ethyl group, a n-propyl group, an isopropyl group, a n-butyl group, an isobutyl group, a tert-butyl group, a n-hexyl group and a n-decyl group, an alkenyl group, such as an allyl group and an isopropenyl group, an aryl group, such as a phenyl group, a 1-naphthyl group and a 2-naphtyl group, and an aralkyl group, such as a benzyl group. Examples of the alkoxy group having from 1 to 20 carbon atoms include a methoxy group, an ethoxy group, a n-propoxy group, an isopropoxy group, a n-butoxy group, an isobutoxy group, a sec-butoxy group, a tert-butoxy group, a n-pentyloxy group, a n-hexyloxy group, a n-heptyloxy group, a n-octyloxy group, a n-nonyloxy group and a n-decyloxy group. Examples of the aryloxy group having from 6 to 20 carbon atoms include a phenoxy group. Examples of the amide group having from 1 to 20 carbon atoms include an N-methylamide group and an N,N-dimethylamide group.

Examples of the phosphide group having from 1 to 20 carbon atoms include a diphenylphosphide group. Examples of the sulfide group having from 1 to 20 carbon atoms include a phenylsulfide group. Examples of the silyl group having from 1 to 20 carbon atoms include a trimethylsilyl group, a triethylsilyl group, a t-butyldimethylsilyl group and a trimethylsilylmethyl group. Examples of the acyl group having from 1 to 20 carbon atoms include an acetyl group, a propionyl group and a butylyl group.

In the transition metal compound represented by the general formula (I), A represents a π-bonding ligand represented by the following general formula (II), and examples of $R^1$ and $R^3$ in the general formula (II) include a hydrogen atom, a halogen atom, an aliphatic hydrocarbon group having from 1 to 20 carbon atoms, an aromatic hydrocarbon group having from 6 to 20 carbon atoms, an alkoxy group having from 1 to 20 carbon atoms, an aryloxy group having from 6 to 20 carbon atoms, a thioalkoxy group having from 1 to 20 carbon atoms, a thioaryloxy group having from 6 to 20 carbon atoms, an amino group, an amide group, a carboxyl group and an alkylsilyl group. Examples of $R^2$ include a halogen atom, an aliphatic hydrocarbon group having from 1 to 20 carbon atoms, an aromatic hydrocarbon group having from 6 to 20 carbon atoms, an alkoxy group having from 1 to 20 carbon atoms, an aryloxy group having from 6 to 20 carbon atoms, a thioalkoxy group having from 1 to 20 carbon atoms, a thioaryloxy group having from 6 to 20 carbon atoms, an amino group, an amide group, a carboxyl group and an alkylsilyl group.

Examples of the aliphatic hydrocarbon group having from 1 to 20 carbon atoms include an alkyl group, such as a methyl group, an ethyl group, a propyl group, a n-butyl group, an isobutyl group, a pentyl group, a hexyl group, a cyclohexyl group and an octyl group; and an alkenyl group, such as a vinyl group, a propenyl group and a cyclohexenyl group. Examples of the aromatic hydrocarbon group having from 6 to 20 carbon atoms include an aralkyl group, such as a benzyl group, a phenethyl group and a phenylpropyl group; an alkyl-substituted phenyl group, such as a tolyl group, a dimethylphenyl group, a trimethylphenyl group, an ethylphenyl group, a propylphenyl group, a butylphenyl group and a tri-t-butylphenyl group; a phenyl group, a biphenyl group, a naphthyl group, a methylnaphthyl group, an anthracenyl group and a phenanthrenyl group. Examples of the thioalkoxy group having from 1 to 20 carbon atoms include a thiomethoxy group. Examples of the thioaryloxy group having from 6 to 20 carbon atoms include a thiophenoxy group. Specific examples of the halogen atom, the alkoxy group having from 1 to 20 carbon atoms, the aryloxy group having from 6 to 20 carbon atoms and the alkylsilyl group include the same groups as exemplified for the general formula (I).

Specific examples of the general formula (II) include 1,2,3,8-tetrahydrocyclopenta[α]indene, 8-methyl-1,2,3,8-tetrahydrocyclopenta[α]indene, 8-ethyl-1,2,3,8-tetrahydrocyclopenta[α]indene, 8-n-propyl-1,2,3,8-tetrahydrocyclopenta[α]indene, 8-phenyl-1,2,3,8-tetrahydrocyclopenta[α]indene, 8-trimethylsilyl-1,2,3,8-tetrahydrocyclopenta[α]indene, 9-methyl-1,2,3,4-tetrahydrofluorene, 9-ethyl-1,2,3,4-tetrahydrofluorene, 9-n-propyl-1,2,3,4-tetrahydrofluorene, 9-phenyl-1,2,3,4-tetrahydrofluorene, 9-trimethylsilyl-1,2,3,4-tetrahydrofluorene, 2,7-tert-butyl-1,3,4-tetrahydrofluorene, 2,7-tert-butyl-9-methyl-1,3,4-tetrahydrofluorene, 2,7-tert-butyl-9-ethyl-1,3,4-tetrahydrofluorene, 2,7-tert-butyl-9-n-propyl-1,3,4-tetrahydrofluorene, 2,7-tert-butyl-9-trimethylsilyl-1,3,4-tetrahydrofluorene, 4a,5,6,7,8,9-hexahydrobenzo[α]azulene, 10-methyl-4a,5,6,7,8,9-hexahydrobenzo[α]azulene, 10-ethyl-4a,5,6,7,8,9-hexahydrobenzo[α]azulene, 10-n-propyl-4a,5,6,7,8,9- hexahydrobenzo[α]azulene, 10-phenyl-4a,5,6,7,8,9-hexahydrobenzo[α]azulene and 10-trimethylsilyl-4a,5,6,7,8,9-hexahydrobenzo[α]azulene.

Specific examples of the general formula (I) include (1,2,3,8-tetrahydrocyclopenta[α]indenyl)-bis(N,N-dimethylaminobenzyl)scandium, (8-methyl-1,2,3,8-tetrahydrocyclopenta[α]indenyl)-bis(N,N-dimethylaminobenzyl)scandium, (9-methyl-1,2,3,4-tetrahydro-1-fluorenyl)-bis(N,N-dimethylaminobenzyl)scandium, (9-ethyl-1,2,3,4-tetrahydro-1-fluorenyl)-bis(N,N-dimethylaminobenzyl)scandium, (9-n-propyl-1,2,3,4-tetrahydro-1-fluorenyl)-bis(N,N-dimethylaminobenzyl)scandium, (9-trimethylsilyl-1,2,3,4-tetrahydro-1-fluorenyl)-bis(N,N-dimethylaminobenzyl) scandium, (4a,5,6,7,8,9-hexahydrobenzo[α]azulenyl)-bis(N,N-dimethylaminobenzyl)scandium, (9-methyl-1,2,3,4-tetrahydro-1-fluorenyl)-bis(trimethylsilylmethyl)scandium, (9-ethyl-1,2,3,4-tetrahydro-1-fluorenyl)-bis(trimethylsilylmethyl)scandium, (9-n-propyl-1,2,3,4-tetrahydro-1-fluorenyl)-bis(trimethylsilylmethyl)scandium, (9-trimethylsilyl-1,2,3,4-tetrahydro-1-fluorenyl)-bis(trimethylsilylmethyl) scandium, (9-methyl-1,2,3,4-tetrahydro-1-fluorenyl)-bis(allyl)scandium, (9-ethyl-1,2,3,4-tetrahydro-1-fluorenyl)bis(allyl)scandium, (9-n-propyl-1,2,3,4-tetrahydro-1-fluorenyl)-bis(allyl)scandium and (9-trimethylsilyl-1,2,3,4-tetrahydro-1-fluorenyl)-bis(allyl)scandium. These may be used solely or as a combination of two or more kinds of them.

The ionic compound of the invention containing a non-coordinatable anion capable of forming a reactive complex through reaction with the transition metal compound represented by the general formula (I), and a cation is not particularly limited, and preferred examples thereof include an ionic compound containing a non-coordinatable anion and a substituted or unsubstituted triarylcarbenium, and an ionic compound containing a non-coordinatable anion and a substituted or unsubstituted anilinium.

Examples of the substituted or unsubstituted triarylcarbenium include a triarylcarbenium represented by the general formula (III):

$(CR^4R^5R^6)^+$      (III)

wherein $R^4$, $R^5$ and $R^6$ each represent an aryl group, such as a phenyl group, a substituted phenyl group, a naphthyl group and an anthracenyl group, which may be the same as or different from each other.

The substituted phenyl group can be represented, for example, by the general formula (IV):

$C_6H_{5-k}R^7_k$      (IV)

wherein $R^7$ represents a hydrocarbyl group having from 1 to 10 carbon atoms, an alkoxy group, an aryloxy group, a thioalkoxy group, a thioaryloxy group, an amino group, an amide group, a carboxyl group or a halogen atom, and k represents an integer of from 1 to 5. In the case where k represents 2 or more, plural groups represented by $R^7$ may be the same as or different from each other.

Specific examples of the substituted or unsubstituted triarylcarbenium represented by the general formula (III) include tri(phenyl)carbenium, tri(toluoyl)carbenium, tri(methoxyphenyl)carbenium, tri(chlorophenyl)carbenium, tri(fluorophenyl)carbenium, tri(xylyl)carbenium, (di(toluoyl), phenyl)carbenium, (di(methoxyphenyl),phenyl)carbenium, (di(chlorophenyl),phenyl)carbenium, (toluoyl, di(phenyl))carbenium, (methoxyphenyl, di(phenyl))carbenium and (chlorophenyl, di(phenyl))carbenium.

Specific examples of the substituted or unsubstituted anilinium include N,N-dimethylanilinium.

Examples of the non-coordinatable anion include a non-coordinatable anion represented by the general formula (V):

$(BZ^1Z^2Z^3Z^4)^-$      (V)

wherein $Z^1$ to $Z^4$ each represent a hydrogen atom, a dialkylamino group, an alkoxy group, an aryloxy group, an alkyl group having from 1 to 20 carbon atoms, an aryl group having from 6 to 20 carbon atoms (including a halogen-substituted aryl group), an alkylaryl group, an arylalkyl group, a substituted alkyl group, an organic metalloid group or a halogen atom.

Specific examples of the non-coordinatable anion represented by the general formula (V) include tetra(fluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(trifluoromethylphenyl)borate, tetra(toluoyl)borate, tetra(xylyl)borate, (triphenyl, pentafluorophenyl)borate, (tris(pentafluorophenyl),phenyl)borate and tridecahydride-7,8-dicarbaundecaborate.

Specific examples of the ionic compound of the invention containing a non-coordinatable anion and a substituted or unsubstituted triarylcarbenium include tri(phenyl)) carbenium tetrakis(pentafluorophenyl)borate, tri(4-methylphenyl) carbenium tetrakis(pentafluorophenyl)borate and tri(4-methoxyphenyl)carbenium tetrakis(pentafluorophenyl)borate.

The ionic compound used in a polymerization catalyst in the invention may be used solely or as a combination of two or more kinds of them.

Examples of the organoaluminum compound include a trialkylaluminum compound, such as trimethylaluminum, triethylaluminum, tri-n-propylaluminum, triisopropylaluminum, tri-n-butylaluminum, triisobutylaluminum and tri-t-butylaluminum, a dialkylaluminum halide compound, such as dimethylaluminum chloride, diethylaluminum chloride, di-n-propylaluminum chloride, diisopropylaluminum chloride, di-n-butylaluminum chloride, diisobutylaluminum chloride and a di-t-butylaluminum chloride, a dialkylaluminum alkoxide compound, such as dimethylaluminum methoxide and dimethylaluminum ethoxide, and a dialkylaluminum hydride, such as dimethylaluminum hydride, diethylaluminum hydride and diisobutylaluminum hydride.

The organoaluminum compound may be used solely or as a combination of two or more kinds of them.

Upon preparing the polymerization catalyst, a contact operation is preferably performed under an atmosphere of an inert gas, such as nitrogen gas. The catalyst components used may be those prepared in a catalyst preparing vessel in advance, or may be prepared in a polymerization vessel for performing copolymerization of the olefin and the organic vinyl compound, and then used for the copolymerization.

[Resin Composition Containing Copolymer and Rubber Polymer]

The copolymer comprising an olefin and an aromatic vinyl compound of the invention has a syndiotactic structure, high block property and a wide molecular weight distribution. Accordingly, a resin composition excellent in heat resistance and impact resistance can be obtained by mixing a rubber polymer with the copolymer.

Various rubber polymers can be used depending on purposes, and preferred examples of the rubber polymer include a rubber polymer containing a styrene compound as one component thereof, such as styrene-butadiene block copolymer rubber, hydrogenated styrene-butadiene block copolymer (SEBS) rubber, styrene-butadiene copolymer rubber and acrylonitrile-butadiene-styrene copolymer rubber. Examples of the rubber polymer also include natural rubber, polybutadiene, polyisoprene, neoprene, low density polyethylene, ethylene-propylene copolymer rubber (EPR) and acrylic rubber. Among these, hydrogenated styrene-butadiene block copolymer rubber and ethylene-propylene copolymer rubber are preferred. These may be used solely or as a combination of two or more kinds of them.

The resin composition of the invention contains the copolymer and the rubber polymer as major components, and the amount of the rubber polymer mixed is from 1 to 50 parts by mass, and preferably from 3 to 40 parts by mass, per 100 parts by mass of the copolymer. When the amount of the rubber polymer mixed is less than 1 part by mass, the improvement effect of impact resistance is lowered, and when it exceeds 50 parts by mass, the heat resistance is lowered.

The resin composition of the invention may contain various additives that have been ordinarily used, such as an antioxidant and a nucleating agent, in such a range that the objects of the invention are not impaired. The copolymer, the rubber polymer and the additives depending on necessity are, for example, kneaded with a kneader, a mixing roll, an extruder or the like to prepare the resin composition of the invention. The resin composition can be molded by a known molding method, such as injection molding, extrusion molding, heat molding, blow molding and foam molding.

[Stretched Product of Copolymer]

The copolymer of the invention is excellent in mechanical strength and ductility, and therefore, a film thereof, which is formed by a known method, is stretched to produce a stretched product thereof excellent in transparency. The stretching process may be uniaxial stretching or biaxial stretching. The stretching ratio is not particularly limited and is optimally from 2 to 10 times. Examples of the stretching method include melt stretching, wet stretching and gel stretching.

Various molded articles of the copolymer of the invention can be produced by the aforementioned method, and in particular, a cast film, an inflated film, a stretched film, a sheet and molded articles thereof are useful for producing a molded article that is required to be subjected to secondary process, such as printing and adhering.

EXAMPLES

The invention will be described with reference to examples, but the invention is not limited to the examples.
<Production of Copolymer comprising Olefin and Aromatic Vinyl Compound>

Example 1

Synthesis of Transition Metal Compound

Synthesis of (9-Ethyl-1,2,3,4-tetrahydro-1-fluorenyl)-bis(N,N-dimethylaminobenzyl)scandium (A) 18 mL (0.12 mmol) of N,N-dimethyl-o-toluidine was placed in a 200 mL glass vessel, to which a mixed solvent of 50 mL of hexane and 16 mL of diethyl ether was added under a nitrogen atmosphere. 50 mL (2.6 mol/L) of a hexane solution of n-butyllithium was slowly added dropwise to the solution under stirring at room temperature over 25 minutes, and the solution was further stirred at room temperature for 45 hours. After completing the reaction, the precipitate was filtered off, and the resulting solid matter was rinsed with hexane and dried under reduced pressure at room temperature to provide 13 g of dimethylaminobenzyllithium ($LiCH_2C_6H_4N(CH_3)_2$-o) (yield: 77%).

(B) 1.0 g (6.6 mmol) of anhydrous scandium chloride and 10 mL of tetrahydrofuran (THF) were placed in a 100 mL glass vessel to prepare a suspension liquid, which was stirred at room temperature for 1 hour. 2.8 g (20 mmol) of the above-obtained dimethylaminobenzyllithium dissolved in 20 mL of THF was added dropwise thereto, followed by stirring for 12 hours. After completing the reaction, THF was removed, and the target compound was extracted with toluene and then purified by recrystallization to provide 2.4 g of tris(dimethylaminobenzyl)scandium (Sc $(CH_2C_6H_4N(CH_3)_2$-o$)_3$) as pale yellow crystals (yield: 80%).

(C) 30 g (0.18 mol) of fluorene was placed in a 1 L glass vessel, to which a mixed solution of 175 mL of ethylenediamine and 175 mL of THF was added under a nitrogen atmosphere, and dissolved by stirring. 5.6 g (0.812 mol) of metallic lithium was added to the resulting solution at 0° C. over 50 minutes. After completing the reaction, water was added thereto, and the target compound was extracted with diethyl ether and rinsed with a sodium chloride aqueous solution. Magnesium sulfate was added to the diethyl ether layer, which was dried in a refrigerator overnight. Magnesium sulfate was filtered off, and diethyl ether was removed to provide 27.6 g of 1,2,3,4-tetrahydrofluorene (4HFluH) as an orange solid matter (yield: 90%).

(D) 5.3 g (31.1 mmol) of the above-obtained 1,2,3,4-tetrahydrofluorene was placed in a 500 mL four-neck flask, to which 100 mL of THF was added under a nitrogen atmosphere. 10 mL (2.6 mol/L) of a hexane solution of n-butyllithium was slowly added dropwise to the solution under stirring at −78° C., followed by stirring at room temperature for 2 hours. 0.89 g (8.2 mmol) of ethyl bromide was added thereto at 0° C. over 2 minutes, followed by stirring at room temperature for 4 hours. After completing the reaction, THF was removed to provide 3.4 g of 9-ethyl-1,2,3,4-tetrahydrofluorene (9-Et-4HFluH) as a colorless oily matter (yield: 75%).

(E) 10 mL of a THF solution of 1.0 g (2.2 mmol) of the scandium compound obtained in the item (B) and 10 mL of a THF solution of 0.53 g (2.7 mmol) of the fluorene compound obtained in the item (D) were placed in a 100 mL glass vessel and refluxed at 70° C. for 12 hours under stirring. After completing the reaction, THF was removed, and the target compound was extracted with 50 mL of hexane and then purified by recrystallization to provide 0.34 g of the final target compound, (9-ethyl-1,2,3,4-tetrahydro-1-fluorenyl)-bis(N,N-dimethylaminobenzyl)scandium, as pale yellow crystals (yield: 30%).

[Production of Styrene-Ethylene Copolymer]

89 mL of toluene, triisobutylaluminum (TIBA) (3.5 mmol) and 300 mL of styrene were placed in a 1 L autoclave, which had been dried by heating, at room temperature under a nitrogen atmosphere. After making the temperature thereof to 70° C. under stirring, 7.5 mL of a toluene solution of (9-ethyl-1,2,3,4-tetrahydro-1-fluorenyl)-bis(N,N-dimethylaminobenzyl)scandium obtained in the item (E) (0.035 mmol) and triphenylcarbenium tetrakispentafluorophenylborate (0.035 mmol), which had been mixed in advance, was added thereto. The mixture was polymerized for 15 seconds while maintaining the pressure to 0.03 MPa with ethylene. After completing the polymerization reaction, the reaction product was placed in a methanol-hydrochloric acid solution, and after stirring sufficiently, the polymer was filtered off, sufficiently rinsed with methanol, and dried to provide 180 g of a styrene-ethylene copolymer. The catalyst activity was 27,400 Kg/gSc/hr. The resulting copolymer had a melting point of 260° C. The melting point was measured by a differential scanning calorimetry (DSC) (measuring apparatus: DSC7, available from Perkin-Elmer, Inc.), which was the same hereinafter.

The measurement of the resulting copolymer with GPC-FT/IR mentioned below revealed that the weight average molecular weight Mw was 519,000 in terms of polystyrene conversion, and the molecular weight distribution (Mw/Mn) was 2.71. The measurement of $^{13}$C-NMR in the manner mentioned in the specification revealed that the ethylene unit content was 3.0% by mol, and the styrene unit content was 97% by mol. The stereoregularity (racemic pentad fraction [rrrr]) of the styrene chain in the copolymer measured by the measuring method mentioned in the specification was 99.5% by mol (measurement limit).

[Measurement Method by GPC-FT/IR]
Measuring Apparatus
1. GPC column oven (produced by GL Science, Inc.)
2. GPC-FTIR (Nicolet MAGNA-RI 650 SPECTROMETER)
3. Data analysis Software (OMNIC SEC-FTIR Ver. 2.10.2)
Measuring Conditions
1. Solvent: 1,2,4-trichlorobenzene
2. Temperature: 145° C.
3. Flow rate: 1.0 mL/min
4. Specimen concentration: 0.3% (w/v)
5. Column: Shodex UT806MLT×2
The molecular weights were those in terms of polystyrene conversion.

Example 2

Production of Styrene-Ethylene Copolymer 367 mL of toluene, TIBA (0.9 mmol) and 25 mL of styrene were placed in a 1 L autoclave, which had been dried by heating, at room temperature under a nitrogen atmosphere. After making the temperature thereof to 70° C. under stirring, 7.5 mL of a toluene solution of (9-ethyl-1,2,3,4-tetrahydro-1-fluorenyl)-bis(N,N-dimethylaminobenzyl)scandium obtained in the item (E) of Example 1 (0.009 mmol) and triphenylcarbenium tetrakispentafluorophenylborate (0.009 mmol), which had been mixed in advance, was added thereto. The mixture was polymerized for 5 minutes while maintaining the pressure to 0.1 MPa with ethylene. After completing the polymerization reaction, the reaction product was placed in a methanol-hydrochloric acid solution, and after stirring sufficiently, the polymer was filtered off, sufficiently rinsed with methanol, and dried to provide 10.1 g of a styrene-ethylene copolymer. The catalyst activity was 300 Kg/gSc/hr. The composition of the resulting copolymer was an ethylene unit content of 5% by mol and a styrene unit content of 95% by mol, and the melting point thereof was 255° C.

The same measurement as in Example 1 revealed that the weight average molecular weight Mw was 150,600, the molecular weight distribution (Mw/Mn) was 2.2, and the stereoregularity [rrrr] was 99.5% by mol (measurement limit). The index Θ showing block property calculated in the manner mentioned below was 99.7%.

Figure 1:
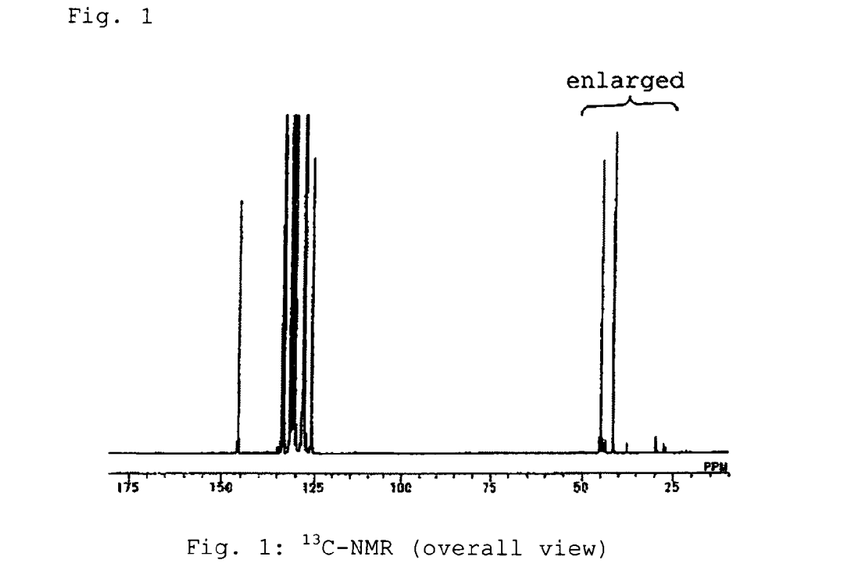
FIG. 1 The figure is a $^{13}$C-NMR spectrum (overall view) of a styrene-ethylene copolymer obtained in Example 2.
Figure 2:
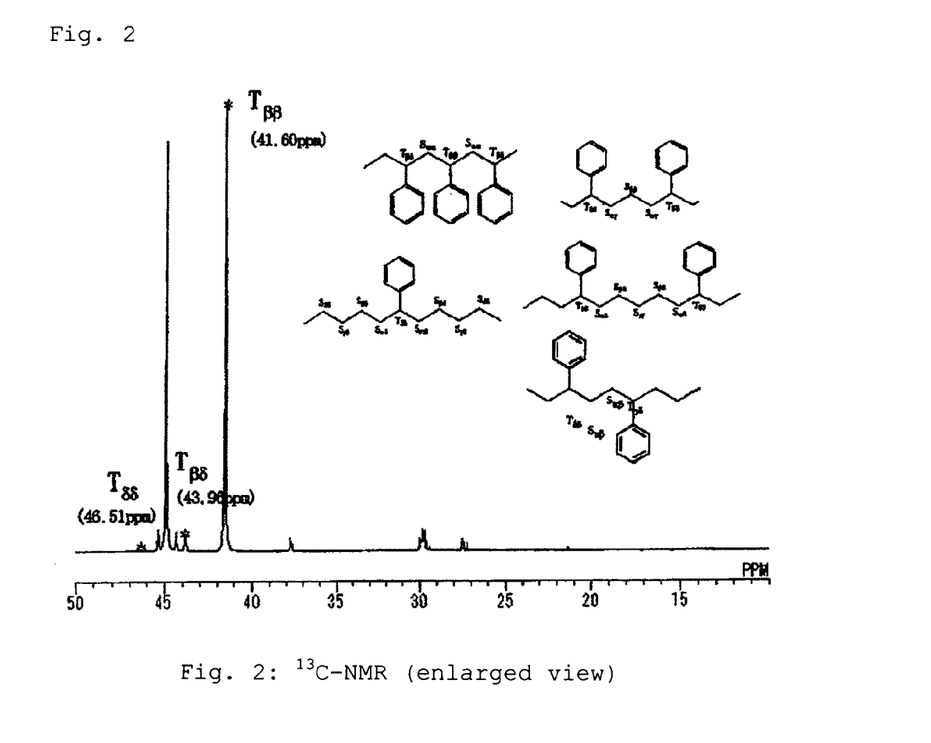
FIG. 2 The figure is a $^{13}$C-NMR spectrum (enlarged view) of a styrene-ethylene copolymer obtained in Example 2.

The resulting $^{13}$C-NMR chart is shown in FIGS. 1 and 2.

[Calculation of Index Θ showing Block Property]

The signal appearing at 29-31 ppm in FIGS. 1 and 2 is derived from a long chain of methylene carbon, and while expressing an ethylene unit by E, can be attributed to a methylene carbon $S_{\delta\delta}$ derived from an EEE chain, a methylene carbon $S_{\gamma\gamma}$ derived from an SEEES chain, and a methylene carbon $S_{\gamma\delta}$ derived from an SEEE chain. The signal appearing at 46.4 ppm is attributed to a $T_{\delta\delta}$ carbon derived from an (ethylene-styrene-ethylene) linkage, and a signal based on a heterogeneous bond of a (styrene-styrene-ethylene-ethylene) linkage or a $T_{\gamma\delta}$ carbon based on a heterogeneous bond of a (styrene-ethylene-styrene-ethylene) linkage. The signal appearing at 37.9 ppm is attributed to an $S_{\alpha\gamma}$ carbon based on an (ethylene-styrene-ethylene) linkage. The signal appearing at 27.9 ppm is attributed to $S_{\beta\delta}$ based on a (styrene-ethylene-ethylene) linkage. The area intensity ratio of $(T_{\delta\delta}+T_{\gamma\delta})/S_{\alpha\gamma}/S_{\beta\delta}$ is approximately 1/2/2, and a signal derived from a long chain of methylene carbon is observed at 29-31 ppm. Accordingly, the following S/E linkage structure is present, wherein S represents a styrene unit.

[chemical formula 3]

The signal appearing at 25.8 ppm is attributed to an $S_{\beta\beta}$ carbon derived from an SES linkage in the following SE linkage structure.

[chemical formula 4]

The signal appearing at 35-34 ppm is considered as being attributed to an $S_{\alpha\beta}$ carbon derived from an inversion bond of styrene expressed by the following structure.

[chemical formula 5]

The signal appearing at 45.0 ppm and the signal appearing at 41.5 ppm are attributed to an $S_{\alpha\alpha}$ carbon and a $T_{\beta\beta}$ carbon, respectively. These are derived from a styrene-styrene triad linkage (a series of three units).

Based on the aforementioned attributions, the sum I ($T_{\delta\delta}+T_{\gamma\delta}+T_{\beta\beta}+T_{\beta\delta}$) of the signal intensities of $T_{\delta\delta}$, $T_{\gamma\delta}$, $T_{\beta\beta}$ and $T_{\beta\delta}$, and the sum I ($T_{\beta\beta}+T_{\beta\delta}$) of the signal intensities of $T_{\beta\beta}$ and $T_{\beta\delta}$ are obtained, and the index Θ showing the block property is calculated. In the calculation of the intensities, ($T_{\delta\delta}+T_{\gamma\delta}$) was based on the signals appearing at 45 ppm to 46.5 ppm, $T_{\beta\beta}$ was based on the signals appearing at 41 ppm to 41.5 ppm, and $T_{\beta\delta}$ was based on the signals appearing at 43 ppm to 44 ppm.

The results are shown in Table 1.

Example 3

Copolymerization of styrene and ethylene was performed in the same manner as in Example 2 except that the pressure of ethylene was changed to 0.5 MPa. As a result, 14.9 g of a styrene-ethylene copolymer was obtained. The catalyst activity was 443 Kg/gSc/hr.

Figure 3:
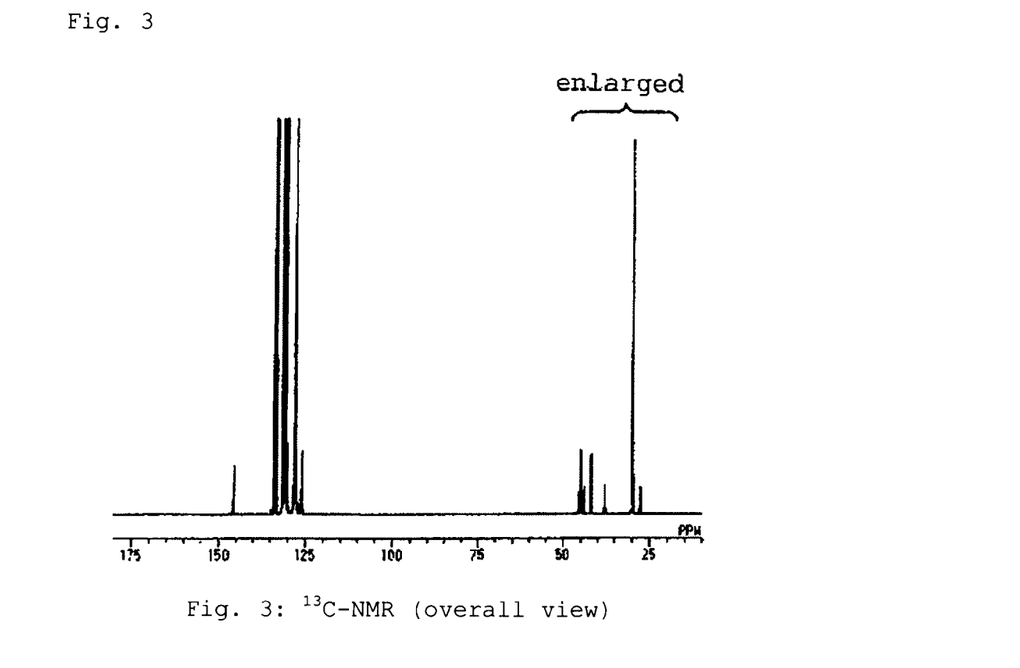
FIG. 3 The figure is a $^{13}$C-NMR spectrum (overall view) of a styrene-ethylene copolymer obtained in Example 3.
Figure 4:
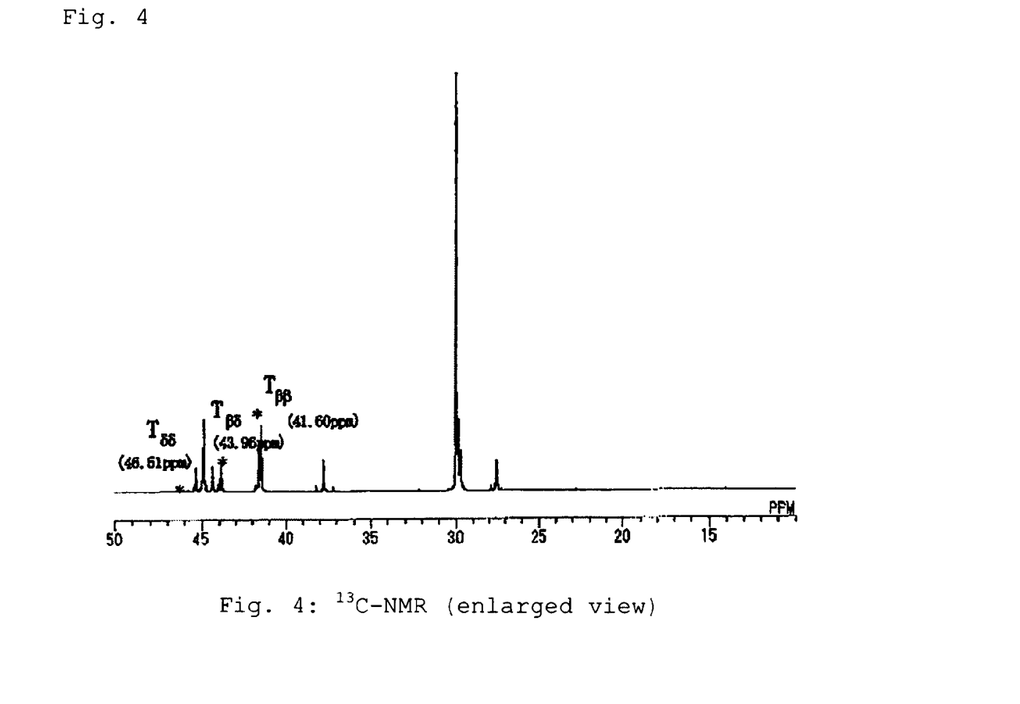
FIG. 4 The figure is a $^{13}$C-NMR spectrum (enlarged view) of a styrene-ethylene copolymer obtained in Example 3.

The composition of the resulting copolymer was an ethylene unit content of 59% by mol and a styrene unit content of 41% by mol, the melting point was 195° C., the weight average molecular weight Mw was 87,400, the molecular weight distribution (Mw/Mn) was 2.1, and the stereoregularity [rrrr] was 99.5% by mol (measurement limit). The index Θ showing block property was 98.7%. The $^{13}$C-NMR chart of the resulting copolymer is shown in FIGS. 3 and 4. The results obtained by measuring in the same manner as in Example 2 are shown in Table 1.

Example 4

Copolymerization of styrene and ethylene was performed in the same manner as in Example 2 except that the pressure of ethylene was changed to 0.7 MPa. As a result, 13.0 g of a styrene-ethylene copolymer was obtained. The catalyst activity was 390 Kg/gSc/hr.

The composition of the resulting copolymer was an ethylene unit content of 68% by mol and a styrene unit content of 32% by mol, the melting point was 169° C., the weight average molecular weight Mw was 69,900, the molecular weight distribution (Mw/Mn) was 2.1, and the stereoregularity [rrrr] was 99.5% by mol (measurement limit). The index Θ showing block property was 98.5%.

Example 5

367 mL of toluene, TIBA (1.8 mmol) and 50 mL of styrene were placed in a 1 L autoclave, which had been dried by heating, at room temperature under a nitrogen atmosphere. After making the temperature thereof to 70° C. under stirring, 7.5 mL of a toluene solution of (9-ethyl-1,2,3,4-tetrahydro-1-fluorenyl)-bis(N,N-dimethylaminobenzyl)scandium obtained in the item (E) of Example 1 (0.027 mmol) and triphenylcarbenium tetrakispentafluorophenylborate (0.027 mmol), which had been mixed in advance, was added thereto. The mixture was polymerized for 5 minutes, and further polymerized for 5 minutes while maintaining the pressure to 0.2 MPa with ethylene. As a result, 44 g of a styrene-ethylene diblock copolymer was obtained.

Figure 5:
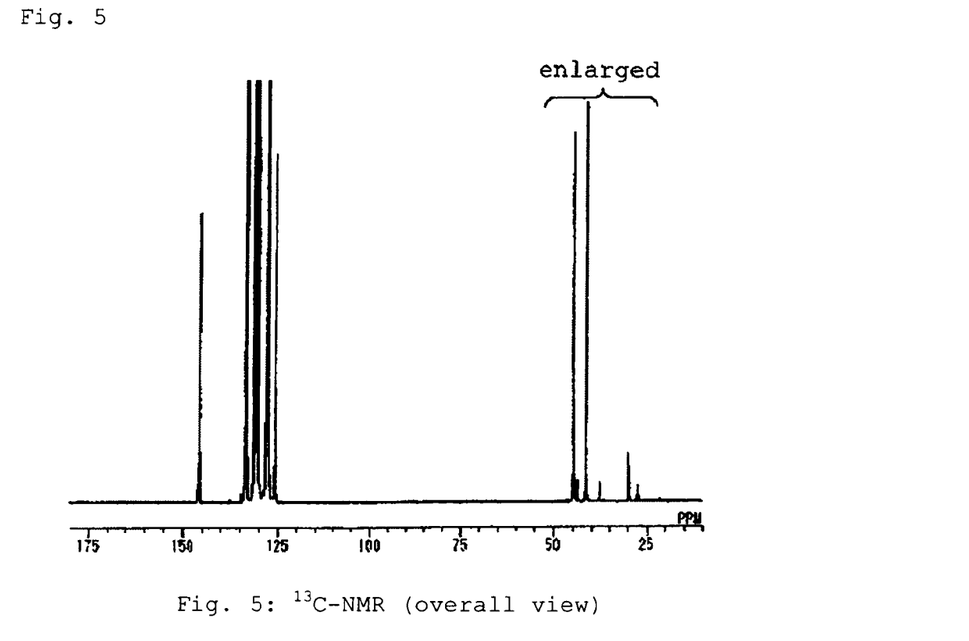
FIG. 5 The figure is a $^{13}$C-NMR spectrum (overall view) of a styrene-ethylene copolymer obtained in Example 5.
Figure 6:
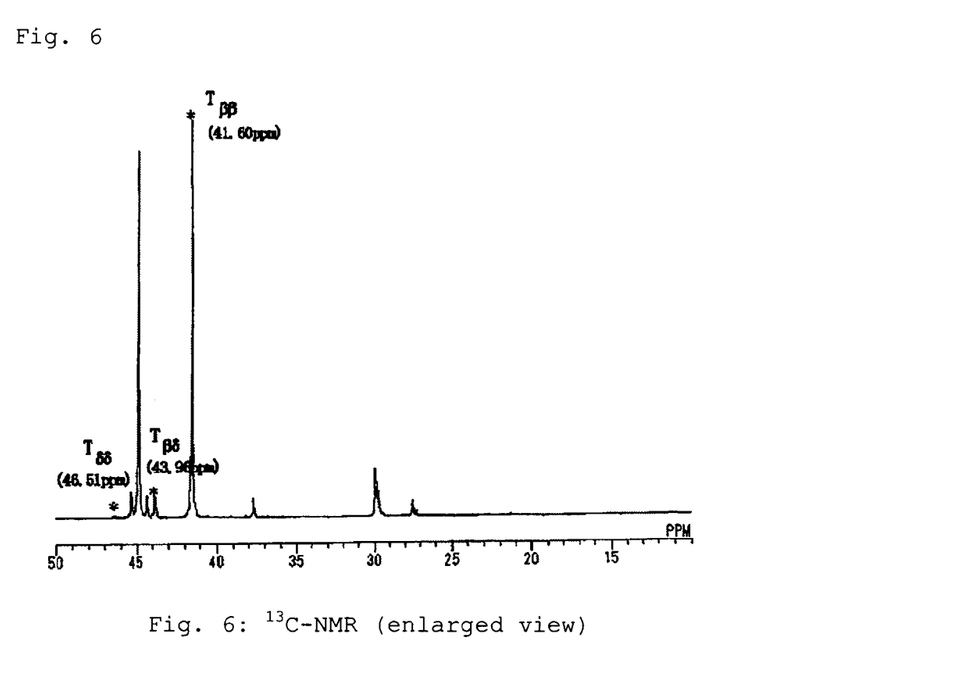
FIG. 6 The figure is a $^{13}$C-NMR spectrum (enlarged view) of a styrene-ethylene copolymer obtained in Example 5.

The composition of the resulting diblock copolymer was an ethylene unit content of 15.6% by mol and a styrene unit content of 84.2% by mol, the melting point was 262° C., the weight average molecular weight Mw was 166,000, the molecular weight distribution (Mw/Mn) was 4.0, and the stereoregularity [rrrr] was 99.5% by mol (measurement limit). The index Θ showing block property was 99.5%. The $^{13}$C-NMR chart of the resulting copolymer is shown in FIGS. 5 and 6. The results obtained by measuring in the same manner as in Example 2 are shown in Table 1.

Example 6

367 mL of toluene, TIBA (1.8 mmol) and 25 mL of styrene were placed in a 1 L autoclave, which had been dried by heating, at room temperature under a nitrogen atmosphere. After making the temperature thereof to 70° C. under stirring, 7.5 mL of a toluene solution of (9-ethyl-1,2,3,4-tetrahydro-1-fluorenyl)-bis(N,N-dimethylaminobenzyl)scandium obtained in the item (E) of Example 1 (0.027 mmol) and triphenylcarbenium tetrakispentafluorophenylborate (0.027 mmol), which had been mixed in advance, was added thereto. The mixture was polymerized for 10 minutes, and further polymerized for 5 minutes while maintaining the pressure to 0.2 MPa with ethylene. Thereafter, ethylene was depressurized, and 25 mL of styrene was newly added, followed by polymerizing for 10 minutes. As a result, 43.8 g of a styrene-ethylene triblock copolymer was obtained.

Figure 7:
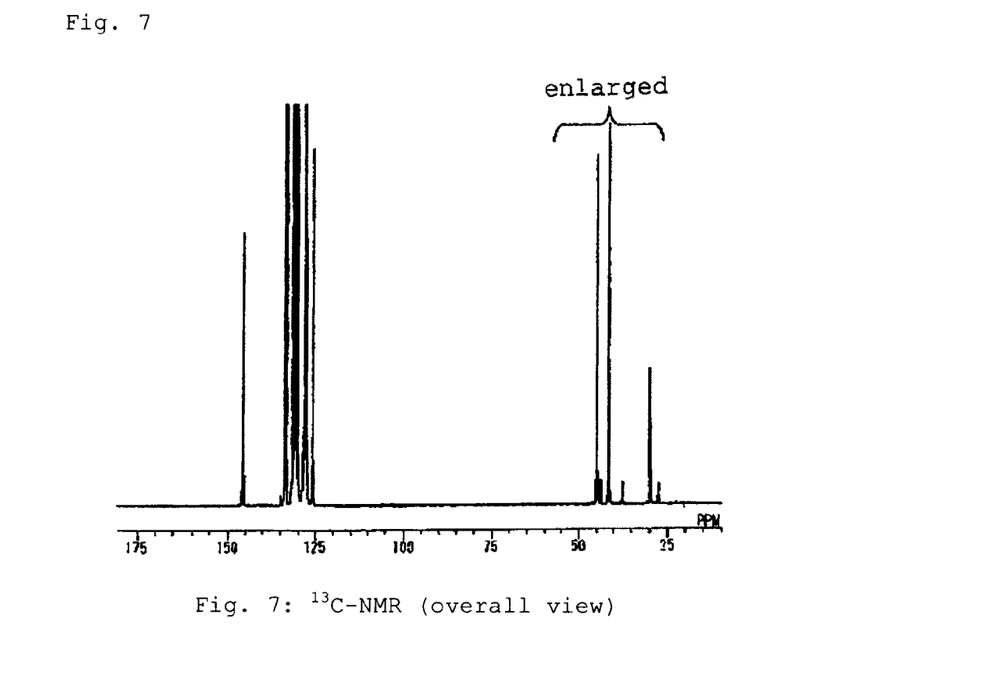
FIG. 7 The figure is a $^{13}$C-NMR spectrum (overall view) of a styrene-ethylene copolymer obtained in Example 6.
Figure 8:
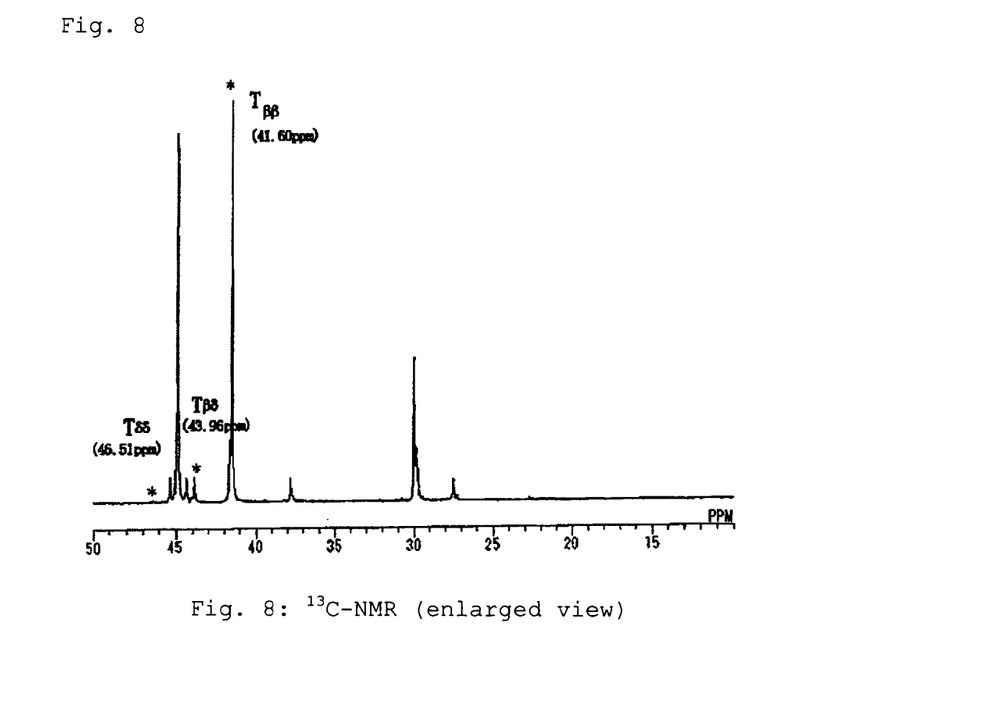
FIG. 8 The figure is a $^{13}$C-NMR spectrum (enlarged view) of a styrene-ethylene copolymer obtained in Example 6.

The composition of the resulting triblock copolymer was an ethylene unit content of 22.5% by mol and a styrene unit content of 77.5% by mol, the melting point was 263° C., the weight average molecular weight Mw was 65,000, the molecular weight distribution (Mw/Mn) was 2.6, and the stereoregularity [rrrr] was 99.5% by mol (measurement limit). The index Θ showing block property was 99.3%. The $^{13}$C-NMR chart of the resulting copolymer is shown in FIGS. 7 and 8. The results obtained by measuring in the same manner as in Example 2 are shown in Table 1.

TABLE 1

| Attribution | Example 2 (chemical shift value) | Example 3 (chemical shift value) | Example 5 (chemical shift value) | Example 6 (chemical shift value) |
|---|---|---|---|---|
| $T_{\delta\delta}$ | observed (46.4) | observed (46.5) | observed (46.5) | observed (46.5) |
| $T_{\gamma\delta}$ | | | | |
| $S_{\alpha\alpha}$ | observed (45.0) | — | — | — |
| $T_{\beta\delta}$ | observed (43.9) | observed (43.9) | observed (43.9) | observed (43.9) |
| $T_{\beta\beta}$ | observed (41.5) | observed (41.6) | observed (41.6) | observed (41.6) |
| $S_{\alpha\gamma}$ | observed (37.9) | — | — | — |
| $S_{\alpha\beta}$ | not observed (35-34) | — | — | — |
| $S_{\delta\delta}$ | observed (29-31) | — | — | — |
| $S_{\beta\delta}$ | observed (27.9) | — | — | — |
| $S_{\beta\beta}$ | observed (25.8) | — | — | — |
| Block index Θ (%) | 99.7 | 98.7 | 99.5 | 99.3 |
| Weight average molecular weight | 150,000 | 87,400 | 166,000 | 65,000 |
| Styrene unit content (% by mol) | 95 | 41 | 84.2 | 77.5 |

Example 7

Synthesis of Transition Metal Compound

Synthesis of (9-Mthyl-1,2,3,4-tetrahydro-1-fluorenyl)-bis(N,N-dimethylaminobenzyl)scandium 5.3 g (31.1 mmol) of the 1,2,3,4-tetrahydrofluorene (4HFluH) obtained in the item (C) of Example 1 was placed in a 500 mL four-neck flask, to which 100 mL of THF was added under a nitrogen atmosphere. 13 mL (2.6 mol/L) of a hexane solution of n-butyllithium was slowly added dropwise to the solution under stirring at −78° C., followed by stirring at room temperature for 2 hours. Thereafter, a precipitate was collected by filtering, and the solid matter was rinsed with hexane and dried to provide 4.4 g of 1,2,3,4-tetrahydrofluorenyllithium (4HFluHLi).

1.2 g (6.8 mmol) of the resulting 4HFluHLi was placed in a 100 mL glass vessel and dissolved in 30 mL of THF added, and then 1.6 g (8.2 mmol) of methyl iodide was added thereto over 5 minutes at 0° C., followed by stirring at room temperature for 4 hours. After completing the reaction, THF was removed to provide 0.8 g of 9-methyl-1,2,3,4-tetrahydrofluorene (9-Me-4HFluH) as a colorless oily matter (yield: 64%).

10 mL of a THF solution of 1.0 g (2.2 mmol) of the scandium compound obtained in the item (B) of Example 1 was placed in a 100 mL glass vessel, to which 10 mL of a THF solution of 0.49 g (2.7 mmol) of 9-Me-4HFluH obtained above was added, followed by stirring at 70° C. for 12 hours. After completing the reaction, THF was removed, and the target compound was extracted with 50 mL of hexane and then purified by recrystallization to provide 0.5 g of the final target compound, (9-methyl-1,2,3,4-tetrahydro-1-fluorenyl)-bis(N,N-dimethylaminobenzyl)scandium, as pale yellow crystals (yield: 45%).

[Production of Styrene-Ethylene Copolymer]

367 mL of toluene, TIBA (0.9 mmol) and 25 mL of styrene were placed in a 1 L autoclave, which had been dried by heating, at room temperature under a nitrogen atmosphere. After making the temperature thereof to 70° C. under stirring, 7.5 mL of a toluene solution of (9-methyl-1,2,3,4-tetrahydro-1-fluorenyl)-bis(N,N-dimethylaminobenzyl)scandium obtained above (0.009 mmol) and triphenylcarbenium tetrakispentafluorophenylborate (0.009 mmol), which had been mixed in advance, was added thereto. The mixture was polymerized for 5 minutes while maintaining the pressure to 0.03 MPa with ethylene. After completing the polymerization reaction, the reaction product was placed in a methanol-hydrochloric acid solution, and after stirring sufficiently, the polymer was filtered off, sufficiently rinsed with methanol, and dried to provide 7.7 g of a styrene-ethylene copolymer. The catalyst activity was 228 Kg/gSc/hr.

The composition of the resulting copolymer was an ethylene unit content of 5% by mol and a styrene unit content of 95% by mol, the melting point was 253° C., the weight average molecular weight Mw was 131,000, the molecular weight distribution (Mw/Mn) was 2.25, and the stereoregularity [rrrr] was 99.5% by mol (measurement limit). The index Θ showing block property was 99.5%.

Example 8

Synthesis of Transition Metal Compound

Synthesis of (9-n-Propyl-1,2,3,4-tetrahydro-1-fluorenyl)-bis(N,N-dimethylaminobenzyl)scandium 5.3 g (31.1 mmol) of the 1,2,3,4-tetrahydrofluorene (4HFluH) obtained in the item (C) of Example 1 was placed in a 500 mL four-neck flask, to which 100 mL of THF was added under a nitrogen atmosphere. 13 mL (2.6 mol/L) of a hexane solution of n-butyllithium was slowly added dropwise to the solution under stirring at −78° C., followed by stirring at room temperature for 2 hours. Thereafter, a precipitate was collected by filtering, and the solid matter was rinsed with hexane and dried to provide 4.4 g of 1,2,3,4-tetrahydrofluorenyllithium (4HFluHLi).

2 g (11 mmol) of the resulting 4HFluHLi was placed in a 100 mL glass vessel and dissolved in 30 mL of THF added, and then 1.7 g (14 mmol) of propylene bromide was added thereto over 2 minutes at 0° C., followed by stirring at room temperature for 4 hours. After completing the reaction, THF was removed to provide 1.2 g of 9-n-propyl-1,2,3,4-tetrahydrofluorene (9-"Pr-4HFluH) as a colorless oily matter (yield: 53%).

10 mL of a THF solution of 1.0 g (2.2 mmol) of the scandium compound obtained in the item (B) of Example 1 was placed in a 100 mL glass vessel, to which 10 mL of a THF solution of 0.57 g (2.7 mmol) of 9-"Pr-4HFluH obtained above was added, followed by stirring at 70° C. for 12 hours. After completing the reaction, THE was removed, and the target compound was extracted with 50 mL of toluene and then purified by recrystallization to provide 0.5 g of the final target compound, (9-n-propyl-1,2,3,4-tetrahydro-1-fluorenyl)-bis(N,N-dimethylaminobenzyl)scandium ((9-"Pr-4HFlu)Sc (CH$_2$C$_6$H$_4$N(CH$_3$)$_2$-o)$_4$), as pale yellow crystals (yield: 45%).

[Production of Styrene-Ethylene Copolymer]

367 mL of toluene, TIBA (0.9 mmol) and 25 mL of styrene were placed in a 1 L autoclave, which had been dried by heating, at room temperature under a nitrogen atmosphere. After making the temperature thereof to 70° C. under stirring, 7.5 mL of a toluene solution of (9-n-propyl-1,2,3,4-tetrahydro-1-fluorenyl)-bis(N,N-dimethylaminobenzyl)scandium obtained above (0.009 mmol) and triphenylcarbenium tetrakispentafluorophenylborate (0.009 mmol), which had been mixed in advance, was added thereto. The mixture was polymerized for 5 minutes while maintaining the pressure to 0.7 MPa with ethylene. After completing the polymerization reaction, the reaction product was placed in a methanol-hydrochloric acid solution, and after stirring sufficiently, the polymer was filtered off, sufficiently rinsed with methanol, and dried to provide 6.8 g of a styrene-ethylene copolymer. The catalyst activity was 201 Kg/gSc/hr.

The composition of the resulting copolymer was an ethylene unit content of 6% by mol and a styrene unit content of 94% by mol, the melting point was 253° C., the weight average molecular weight Mw was 136,000, the molecular weight distribution (Mw/Mn) was 2.26, and the stereoregularity [rrrr] was 99.5% by mol (measurement limit). The index 0 showing block property was 99.5%.

Comparative Example 1

Synthesis of Transition Metal Compound

Synthesis of (1,2,3,4-Tetramethyl-5-trimethylsilyl-cyclopentadienyl)bis(trimethylsilylmethyl)scandium (THF)

Scandium chloride and trimethylsilylmethyllithium (LiCH$_2$SiMe$_3$) were reacted at a ratio of 1/3 in THF, and 10 mL of a hexane solution of 1.37 g (3.03 mmol) of the resulting reaction product, tris(trimethylsilylmethyl)scandium (Sc (CH$_2$SiMe$_3$)$_3$)) was prepared. 0.59 g (3.03 mmol) of 1,2,3,4-tetramethyl-5-trimethylsilylcyclopentadiene was added to the thus prepared solution at room temperature and reacted for 2 hours. After the reaction, the product was purified by recrystallization to provide the target product, (1,2,3,4-tetramethyl-5-trimethylsilyl-cyclopentadienyl)bis(trimethylsilylmethyl)scandium (THF) as colorless crystals. The yield was 70%.

[Polymerization of Styrene-Ethylene Copolymer]

Copolymerization of styrene and ethylene was performed under the same conditions as in Example 2 except that the transition metal compound was changed to the aforementioned (1,2,3,4-tetramethyl-5-trimethylsilyl-cyclopentadienyl)bis(trimethylsilylmethyl)scandium (THF), and the aluminum compound was not used. As a result, 1.0 g of a styrene-ethylene copolymer was obtained. The catalyst activity was 30 Kg/gSc/hr.

The composition of the resulting copolymer was an ethylene unit content of 8% by mol and a styrene unit content of 92% by mol, the melting point was 261° C., the weight average molecular weight Mw was 156,000, the molecular weight distribution (Mw/Mn) was 1.3, and the stereoregularity [rrrr] was 99.5% by mol (measurement limit). The index Θ showing block property was 87.6%.

<Resin Composition containing Copolymer and Rubber Polymer>

Example 9

340 mL of dehydrated toluene, 50 mL of styrene and TIBA (3.5 mmol) were placed in a 1 L autoclave, which had been dried by heating, at room temperature under a nitrogen atmosphere. After making the temperature thereof to 30° C. under stirring, mL of a toluene solution of (9-ethyl-1,2,3,4-tetrahydro-1-fluorenyl)-bis(N,N-dimethylaminobenzyl)scandium obtained in the item (E) of Example 1 (0.035 mmol) and triphenylcarbenium tetrakispentafluorophenylborate (0.035 mmol), which had been mixed in advance, was added thereto. The mixture was polymerized for 5 minutes while maintaining the pressure to 0.03 MPa with ethylene. After completing the polymerization reaction, the reaction product was placed in a methanol-hydrochloric acid solution, and after stirring sufficiently, the polymer was filtered off, sufficiently rinsed with methanol, and dried to provide 41 g of a styrene-ethylene copolymer.

The composition of the resulting copolymer was an ethylene unit content of 4% by mol and a styrene unit content of 96% by mol, the melting point was 260° C., the weight average molecular weight Mw was 532,000, the molecular weight distribution (Mw/Mn) was 3.9, and the stereoregularity [rrrr] was 99.5% by mol (measurement limit). The index Θ showing block property was 99.4%.

80% by mass of the styrene-ethylene copolymer having a syndiotactic structure obtained above and 20% by mass of SEBS (Septon 8006, produced by Kuraray Co., Ltd.) as a rubber polymer, to which, based on 100 parts by mass in total of them, 0.2% by mass of Irganox 1010 (produced by Ciba Specialty Chemicals Co., Ltd.) 0.2% by mass of (2,6-di-t-butyl-4-methylphenyl)pentaerythritol diphosphite (PEP36, a trade name, produced by ADEKA Corporation) as antioxidants and 0.5% by mass of a nucleating agent (NA11, a trade name, produced by ADEKA Corporation) were added, were kneaded with Labo-Plastomill. The kneading conditions were a set temperature of 290° C., a period of time of 3 minutes and a torque of 50 per minute.

The composition obtained by the aforementioned kneading operation was formed into a thickness of 1 mm by using a hot-press molding machine to prepare a test specimen, which was measured for tensile properties.

The tensile properties (measurement of tensile elastic modulus, breaking strength, breaking elongation and yield strength) were measured with a tensile tester, Instron 1157, according to JIS K7113. A test specimen having a thickness of 12 mm was prepared and measured for IZOD impact strength with a versatile impact tester, produced by Toyo Seiki Co., Ltd., according to JIS K7110. The heat decomposition temperature was measured with a measuring apparatus, TG-DTA6300, produced by SII NanoTechnology Inc., according to JIS K7120, and a temperature, at which 5% mass reduction was observed for the resulting composition, was designated thereto. The results are shown in Table 2.

Example 10

340 mL of dehydrated toluene, 50 mL of styrene and TIBA (1.8 mmol) were placed in a 1 L autoclave, which had been dried by heating, at room temperature under a nitrogen atmosphere. After making the temperature thereof to 70° C. under stirring, mL of a toluene solution of (9-ethyl-1,2,3,4-tetrahydro-1-fluorenyl)-bis(N,N-dimethylaminobenzyl)scandium obtained in the item (E) of Example 1 (0.027 mmol) and triphenylcarbenium tetrakispentafluorophenylborate (0.027 mmol), which had been mixed in advance, was added thereto. The mixture was homopolymerized for styrene for 5 minutes, and then further polymerized for 5 minutes while maintaining the pressure to 0.1 MPa with ethylene. After completing the polymerization reaction, the reaction product was placed in a methanol-hydrochloric acid solution, and after stirring sufficiently, the polymer was filtered off, sufficiently rinsed with methanol, and dried to provide 43 g of a styrene-ethylene copolymer.

The composition of the resulting copolymer was an ethylene unit content of 7.2% by mol and a styrene unit content of 92.8% by mol, the melting point was 261° C., the weight average molecular weight Mw was 192,000, the molecular weight distribution (Mw/Mn) was 3.94, and the stereoregularity [rrrr] was 99.5% by mol (measurement limit). The index θ showing block property was 99.7%.

A composition was produced and evaluated in the same manner as in Example 9 except that the resulting styrene-ethylene copolymer having a syndiotactic structure was used. The results are shown in Table 2.

Example 11

A composition was produced and evaluated in the same manner as in Example 9 except that Engage 8150 (produced by Dow Chemical Company) was used as a rubber polymer instead of SEBS. The results are shown in Table 2.

Comparative Example 2

A composition was produced and evaluated in the same manner as in Example 9 except that syndiotactic polystyrene (Xarec 130ZC, a trade name, produced by Idemitsu Kosan Co., Ltd.) was used instead of the styrene-ethylene copolymer having a syndiotactic structure. The results are shown in Table 2.

TABLE 2

Evaluation of Properties of Compositions

|  | Example 9 | Example 10 | Example 11 | Comparative Example 2 |
|---|---|---|---|---|
| Tensile elastic modulus (MPa) | 2,100 | 2,190 | 2,248 | 1,854 |
| Breaking strength (MPa) | 32.4 | 28.4 | 29.9 | 24.7 |
| Breaking elongation (%) | 15.0 | 18.0 | 21.0 | 2.7 |
| Yield strength (MPa) | 33.8 | 31.2 | 32.2 | 25.5 |
| IZOD impact strength (kJ/m$^2$) | 51.5 | 75.1 | 76.1 | 17.1 |
| Heat decomposition temperature (° C.) [5% reduction of mass] | 385 | 401 | 394 | 396 |

<Stretched Product of Copolymer (Biaxial Stretching)>

Example 12

2.8 L of dehydrated toluene, 263 mL of styrene and TIBA (28 mmol) were placed in a 5 L autoclave, which had been dried by heating, at room temperature under a nitrogen atmosphere. After making the temperature thereof to 30° C. under stirring, mL of a solution of (9-ethyl-1,2,3,4-tetrahydro-1-fluorenyl)-bis(N,N-dimethylaminobenzyl)scandium obtained in the item (E) of Example 1 (0.56 mmol) and triphenylcarbenium tetrakispentafluorophenylborate (0.56 mmol), which had been mixed in advance, was added thereto. The mixture was polymerized for 5 minutes while maintaining the pressure to 0.1 MPa with ethylene. After completing the polymerization reaction, the reaction product was placed in a methanol-hydrochloric acid solution, and after stirring sufficiently, the polymer was filtered off, sufficiently rinsed with methanol, and dried to provide 203 g of a styrene-ethylene copolymer.

The composition of the resulting copolymer was an ethylene unit content of 25% by mol and a styrene unit content of 75% by mol, the melting point was 238° C., the weight average molecular weight Mw was 195,000, the molecular weight distribution (Mw/Mn) was 3.3, and the stereoregularity [rrrr] was 99.5% by mol (measurement limit). The index Θ showing block property was 99.4%.

The resulting styrene-ethylene copolymer having a syndiotactic structure was formed into pellets with a twin screw extruder at a temperature of 260° C. A raw sheet for stretching of 250μ was produced from the pellets with a single screw extruder with a diameter of 25 mm at a temperature of 300° C. The biaxial stretching operation was performed by sequential biaxial stretching with a table tenter. The stretching ratios (MD×TD) were 3×3.4. The sheet was heat-treated in an air oven at 200° C. for 30 seconds to provide a stretched film. The results of evaluation of properties (tensile elastic modulus, tensile yield strength, tensile breaking strength, tensile breaking elongation, Elmendorf's tear strength, film impact, and haze) of the resulting stretched film are shown in Table 3.

Comparative Example 3

A stretched film was obtained in the same biaxial stretching operation as in Example 12 by using syndiotactic polystyrene for a stretched film (Xarec F2907, a trade name, produced by Idemitsu Kosan Co., Ltd.). The resulting stretched film was evaluated for properties in the same manner as in Example 12. The results are shown in Table 3.

TABLE 3

Evaluation of Properties of Stretched Films

|  |  |  | Example 12 | | Comparative Example 3 | |
|---|---|---|---|---|---|---|
|  |  |  | MD | TD | MD | TD |
| Mechanical properties | Tensile elastic modulus *[1] | MPa | 4,000 | 4,500 | 3,600 | 4,100 |
|  | Tensile yield strength *[2] | MPa | 80 | 85 | 79 | 82 |
|  | Tensile breaking strength *[3] | MPa | 120 | 135 | 113 | 112 |
|  | Tensile breaking elongation *[4] | % | 60 | 82 | 50 | 38 |
|  | Elmendorf's tear strength *[5] | N/cm | 3.3 | 3.9 | 1.9 | 1.7 |
|  | Film impact | J/m | 35,000 | | 29,000 | |
| Transparency | Total haze *[6] |  | 0.5 | | 2.9 | |
|  | External haze *[6] |  | 0.8 | | 2.1 | |
|  | Internal haze *[6] |  | 0.3 | | 0.8 | |

*[1] tensile elastic modulus, measured according to JIS K7133
*[2] tensile yield strength, measured according to JIS K7133
*[3] tensile breaking strength, measured according to JIS K7133
*[4] tensile breaking elongation, measured according to JIS K7133
*[5] Elmendorf's tear strength, measured according to JIS K7128-2
*[6] total haze, measured according to JIS K7105
*[6] external haze, measured according to JIS K7105
*[6] internal haze, measured according to JIS K7105

INDUSTRIAL APPLICABILITY

The resin composition of the invention is useful particularly for industrial materials for injection molding, extrusion molding and the like. The stretched product of the invention is useful particularly for OA appliance members, miscellaneous goods, light electrical appliance members, daily commodities, food packages, laminate films, heat-shrinkable films and the like.

The invention claimed is:

1. A copolymer having greater than 50% syndiotactic structure comprising an olefin and an aromatic vinyl compound, wherein a content of a unit derived from the aromatic vinyl compound is from 1 to 99% by mol; a molecular distribution (Mw/Mn) measured by a GPC method is 1.7 or more; in $^{13}$C-NMR measurement, a signal $T_{\delta\delta}$ based on an (olefin-aromatic vinyl compound-olefin) linkage as a node of the copolymer, a signal $T_{\beta\delta}$ based on an (aromatic vinyl compound-aromatic vinyl compound-olefin) linkage, a signal $T_{\beta\beta}$ based on an (aromatic vinyl compound-aromatic vinyl compound-aromatic vinyl compound) linkage as a block linkage of the aromatic vinyl compound, and $S_{\delta\delta}$ based on an (olefin-olefin-olefin) linkage as a block linkage of the olefin are present; an index Θ showing block property of the aromatic vinyl compound component represented by the following relational expression is from 30 to 100%; and a stereoregularity [rrrr] of a repeating unit chain constituted by the aromatic vinyl compound is 80% by mol or more:

$$\Theta = \frac{I(T_{\beta\beta} + T_{\beta\delta})}{I(T_{\delta\delta} + T_{\gamma\delta} + T_{\beta\beta} + T_{\beta\delta})} \times 100(\%)$$

wherein $I(T_{\beta\beta}+T_{\beta\delta})$ represents a sum of intensities of the signal $T_{\beta\beta}$ and the signal $T_{\beta\delta}$ in the $^{13}$C-NMR measurement, and $I(T_{\delta\delta}+T_{\gamma\delta}+T_{\beta\beta}+T_{\beta\delta})$ represents a sum of intensities of signals $T_{\delta\delta}$, $T_{\gamma\delta}$, $T_{\beta\beta}$ and $T_{\beta\delta}$ based on all linkages that the aromatic vinyl compound contributes to in the $^{13}$C-NMR measurement, wherein $T_{\gamma\delta}$ represents a signal based on an (aromatic vinyl compound-aromatic vinyl compound-olefin-olefin) linkage as a heterogeneous bond or a signal based on an (aromatic vinyl compound-olefin-aromatic vinyl compound-olefin) linkage as a heterogeneous bond.

2. A method for producing the copolymer comprising an olefin and an aromatic vinyl compound according to claim 1, comprising: copolymerizing an olefin and an aromatic vinyl compound in the presence of a polymerization catalyst containing a transition metal.

3. A resin composition comprising from 1 to 50 parts by mass of a rubber polymer mixed with 100 parts by mass of the copolymer comprising an olefin and an aromatic vinyl compound according to claim 1.

4. A stretched product comprising the copolymer comprising an olefin and an aromatic vinyl compound according to claim 1 having been stretched.

5. The copolymer of claim 1, having sharp and strong peaks at approximately 45 ppm and approximately 41.5 ppm in the $^{13}$C-NMR.

6. The copolymer of claim 5, wherein the peaks at approximately 45 ppm and approximately 41.5 ppm are sharper and stronger than a peak at approximately 30 ppm.

7. The copolymer of claim 1, having a molecular weight distribution $M_w/M_n$ of 2.0 to 5.0.

8. The copolymer of claim 1, wherein the olefin monomer is at least one selected from the group consisting of ethylene, propylene, butene, pentene, hexene, heptene, octene and nonene.

9. The copolymer of claim 1, wherein the aromatic vinyl compound is at least one selected from the group consisting of p-methylstyrene, p-ethylstyrene, p-propylstyrene, p-isopropylstyrene, p-butylstyrene, p-tert-butylstyrene, o-methylstyrene, o-ethylstyrene, o-propylstyrene, o-isopropylstyrene, m-methylstyrene, m-ethylstyrene, m-propylstyrene, m-isopropylstyrene and m-butylstyrene.

10. The copolymer of claim 1, wherein the index Θ is from 50 to 100%.

11. The copolymer of claim 1, wherein the index Θ is from 80 to 100%.

12. The copolymer of claim 1, having a weight average molecular weight of 50,000 to 900,000 in terms of polystyrene conversion.

13. The copolymer of claim 1, having a stereoregularity [rrrr] of 95% by mol or more.

14. The copolymer of claim 1, wherein the olefin is ethylene and the aromatic vinyl compound is styrene, and wherein the index Θ is from 99.3 to 99.7.

15. The copolymer of claim 14, having a weight average molecular weight of 65,000-150,000.

16. The copolymer of claim 14, having a styrene content of from 77.5 to 95% by mol.

17. The copolymer of claim 1, having at least one of (i) a tensile elastic modulus of 2,100-2,248 MPa, (ii) a breaking strength of from 28.4 to 32.4 MPa, (iii) a breaking elongation of 15.0-21.0%, (iv) a yield strength of from 31.2 to 33.8 MPa, and (v) an IZOD impact strength of from 51.5 to 76.1 kJ/m$^2$.

18. The copolymer of claim 1, wherein the olefin is a monounsaturated olefin.

* * * * *